United States Patent
Bouda

(10) Patent No.: US 6,643,432 B2
(45) Date of Patent: Nov. 4, 2003

(54) OPTICAL WAVEGUIDE DEVICE AND OPTICAL WAVEGUIDE METHOD

(75) Inventor: Martin Bouda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/986,573

(22) Filed: Nov. 9, 2001

(65) Prior Publication Data

US 2002/0114572 A1 Aug. 22, 2002

(30) Foreign Application Priority Data

Feb. 16, 2001 (JP) ........................................ 2001-040571

(51) Int. Cl.[7] ................................................ G02B 6/26
(52) U.S. Cl. ........................................... 385/43; 385/46
(58) Field of Search ................................ 385/42, 43, 46

(56) References Cited

U.S. PATENT DOCUMENTS 6,069,990 A  * 5/2000 Okawa et al. ................. 385/43
6,222,966 B1 * 4/2001 Khan et al. .................... 385/45
6,463,188 B1 * 10/2002 Takahashi et al. ............ 385/14

FOREIGN PATENT DOCUMENTS

JP           4-125604       4/1992

* cited by examiner

Primary Examiner—John D. Lee
Assistant Examiner—Jennifer Doan
(74) Attorney, Agent, or Firm—Armstrong, Westerman & Hattori, LLP

(57) ABSTRACT

An optical waveguide device comprises an input waveguide for converting incident light into a single optical mode, a plurality of output waveguides for splitting power of incident light and outputting it, and a tapered waveguide for connecting the input waveguide and the output waveguides, gradually increasing in width from the input waveguide toward the output waveguides, and the tapered waveguide has a non-adiabatic state, that is, a sufficiently large taper angle such that lower order optical modes couple into higher order optical modes while light propagates along the tapered waveguide.

12 Claims, 5 Drawing Sheets

WAVE FRONT

PRIOR ART

PRIOR ART

OPTICAL WAVEGUIDE DEVICE AND OPTICAL WAVEGUIDE METHOD

CROSS-REFERENCE TO RELATED APPLICATIONS

This application is based upon and claims priority of Japanese Patent Application No. 2001-040571, filed on Feb. 16, 2001, the contents being incorporated herein by reference.

BACKGROUND OF THE INVENTION

1. Field of the Invention

The present invention relates to an optical waveguide device for trapping incident light in an area and transmitting the energy in a direction to output it.

2. Description of the Related Art

Splitting and combining of optical power (energy) are important basic functions in many optical waveguide devices including waveguides. In this case, reduction of energy loss between input and output and improvement of transmission loss uniformity among output ports are important objectives. Meanwhile, reduction of dimensions of optical waveguide devices is another requirement necessary to reduce manufacturing cost and facilitate use of the device in a broader range of applications.

Concrete examples of conventional optical waveguide splitting and combining devices are presented below.

First, a Multi-Mode Interference device (MMI) is cited as shown in FIG. 7.

The device is constituted by including an input waveguide 101 for converting incident light into a single optical mode, a plurality of output waveguides 102 for splitting power and to output it, and a waveguide 103 formed with a constant width along the propagation direction of light, connecting the input waveguide 101 and the output waveguides 102, and causing the propagation of a plurality of optical modes along the propagation direction of light.

Incident light, which is converted into a single optical mode by the input waveguide 101, is converted into a plurality of optical modes in the waveguide 103, and the power thereof is divided equally over the output waveguides 102 to be outputted. The field intensity in an end portion of the waveguide 103 on the side of the output waveguides 102 (in FIG. 7, marked by ellipse E) is distributed in a form having peaks at locations corresponding to the positions of the output waveguides 102. The distribution is shown in FIG. 7.

Next, a Star Coupler device is cited as shown in FIG. 8.

The device is constituted by including the input waveguide 101 as in the MMI device, a plurality of output waveguides 104 in a tapered form decreasing in width toward the output portions, radially provided for splitting power and to output it, and a passage 105 for connecting the input waveguide 101 and the output waveguides 104 and allowing light to freely propagate therethrough toward the output waveguides 104.

Incident light converted into a single optical mode by the input waveguide 101 freely propagates in the passage 105 and the power thereof is split in the output waveguides 104 to be outputted. The field intensity in an end portion of the passage 105 on the side of the output waveguides 104 (in FIG. 8, marked by ellipse E) is distributed smoothly in substantially a bell shape with a peak in the center region as shown in FIG. 8.

Next, a Y-branch device is cited as shown in FIG. 9.

The device is constituted by including the input waveguide 101 as in the MMI device, two output waveguides 106, each provided radially to split power and output it, and a tapered waveguide 107 for connecting the input waveguide 101 and the output waveguides 106 and having a very small taper angle to be adiabatic, that is, to make an optical mode invariable along the light propagation direction.

Incident light, which is converted into a single optical mode by the input waveguide 101, propagates along the waveguide 107 without changing optical mode, and the power thereof is split in the output waveguides 106 to be outputted. The field intensity at an end portion of the waveguide 107 on the side of the output waveguides 106 (in FIG. 9, marked by ellipse E) is distributed smoothly in substantially a bell shape with a peak in the center region as shown in FIG. 9.

However, the above-described conventional optical waveguide devices have the following disadvantages.

MMI devices are excellent in obtaining uniform optical coupling among the output waveguides 102 constituting the output ports, but the length of the waveguide 103 increases quadratically with the number of ports, which inevitably results in excessive device dimensions not practical for fabrication if a sufficient number of output ports is provided.

Star coupler devices can be reduced in size to be compact even with a number of output ports being provided, but require adjustment of the width of the passage 105 for obtaining uniformity in optical coupling among the output ports. In this case, extremely large width is required, which results in an increased length of the passage 105, and it is also necessary to provide tapers at each of the output waveguides 104, thus further increasing the size of the entire device.

The Y-branch devices realize an adiabatic state avoiding optical mode conversion, which requires reduction of the taper angle, and thus it requires extreme increases in length.

As described above, the conventional optical waveguide devices can satisfy the requirement of uniform optical coupling among the output ports, but it is extremely difficult for them to satisfy the requirement of reduction in size of the entire devices while satisfying the above requirement at present.

SUMMARY OF THE INVENTION

The present invention is made in view of the aforementioned problems, and its objective is to provide an optical waveguide device and an optical waveguide method with high reliability and high precision, which sufficiently meet both requirements of uniform optical coupling among the output ports and reduction in the entire device size, and being suitable for various kinds of useful applications.

The inventor reaches the modes of the invention presented below as a result of detailed study.

An optical waveguide device of the present invention comprises a single optical mode input waveguide, a plurality of output waveguides, and a tapered waveguide for connecting the aforementioned input waveguide and aforementioned output waveguides, gradually increasing in width from the aforementioned input waveguide toward the aforementioned output waveguides, and is characterized in that the aforementioned tapered waveguide has a sufficiently large taper angle so that optical power guided by lower order optical modes couple into higher order optical modes while the light propagates along the tapered waveguide.

Here, it is preferable that the width at a narrow end of the aforementioned tapered waveguide is larger than the width of the aforementioned input waveguide, but is set to a value small enough to support a discrete spectrum of a certain number of optical modes.

Further, it is preferable that the aforementioned tapered waveguide has a linear taper plane in section made by optimizing the taper angle by a numerical analysis method so that a field intensity profile at the wide end of the tapered waveguide is maximally flat.

Furthermore, it is preferable that the aforementioned output waveguides are provided in such a direction that the axes thereof point to the narrow end of the aforementioned tapered waveguide.

Further, it is preferable that the aforementioned output waveguides are placed on a wave front of an electromagnetic wave at the wide end of the aforementioned tapered waveguide.

Still further, it is preferable that each of the aforementioned output waveguides has a width optimized by a numerical analysis method to obtain substantially equal power coupling efficiency.

Furthermore, it is preferable that the aforementioned output waveguides are tapered, gradually increasing in width toward the wide end of the aforementioned tapered waveguide.

In this case, it is preferable that each of the aforementioned output waveguides has a sufficiently large taper angle so that higher order optical modes couple into lower order optical modes while the light propagates along each of the output waveguides.

Further, it is preferable that the aforementioned output waveguides are in a bent form.

Furthermore, the present invention also relates to an optical waveguide method, characterized by including the steps of converting incident light into a single optical mode, and after guiding the light into a waveguide having a sufficiently large taper angle such that lower order optical modes couples into higher order optical modes, splitting power thereof into a plurality of powers to output them.

In the optical waveguide device of the present invention, the waveguide has a non-adiabatic structure for causing mode conversion of transmitted light, thus making it possible to obtain uniform optical coupling among the output ports. Further, in addition to this, the waveguide has a sufficiently large taper angle such that lower order optical modes couple into higher order optical modes to achieve the aforementioned non-adiabatic structure, and therefore it is not necessary to increase the length of the waveguide as in the case of an adiabatic structure, thus making it possible to reduce the entire device in size even if further uniform optical coupling is intended with many output ports being provided. Specifically, it becomes possible to provide many output ports, to increase uniformity of optical coupling, minimize an increase in device size following this, and sufficiently meet the requirement for reduction in size of the device.

More specifically, when the tapered waveguide is constructed to have the linear taper plane in section, the length of the waveguide only increases proportionally to the number of output ports. Accordingly, as the number of output ports is increased, relative reduction in the device size becomes more remarkable, and thus the present invention is useful in realizing a compact optical waveguide device with more uniform optical coupling.

DETAILED DESCRIPTION OF THE PREFERRED EMBODIMENTS

A preferred embodiment of the present invention will be explained in detail below with reference to the drawings.

Figure 1:
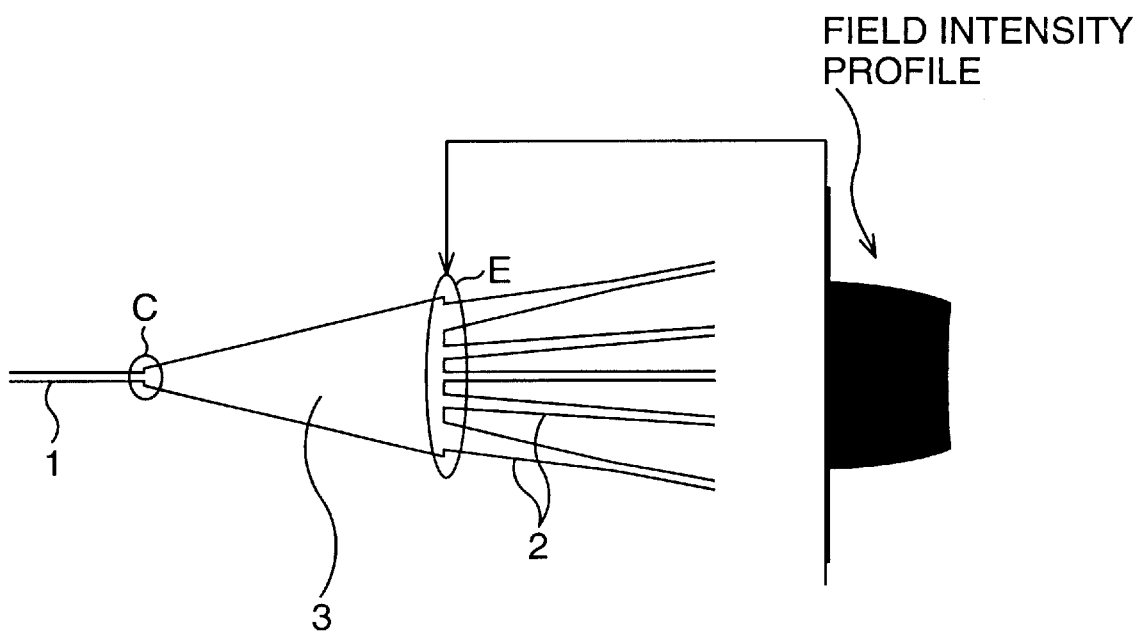
FIG. 1 is a schematic sectional view showing a main constitution of an optical waveguide device of a present embodiment.

FIG. 1 is a schematic sectional view showing a main constitution of an optical waveguide device of the present embodiment.

The optical waveguide device is constituted by including an input waveguide 1 for converting incident light into a single optical mode, a plurality of output waveguides 2 for splitting power of incident light and to output it, and a tapered waveguide 3 connecting the input waveguide 1 and the output waveguides 2 and gradually increasing in width as it extends from the input waveguide 1 to the output waveguides 2.

The tapered waveguide 3 has a non-adiabatic state, that is, the taper angle is sufficiently large such that lower order optical modes couple into higher order modes during propagation of light along the tapered waveguide 3. More specifically, the taper is linear in section (hereinafter, called a linear taper) optimized by a numerical analysis method such that the field intensity profile at the wide end of the tapered waveguide 3 is maximally flat.

Further, as shown in circle C in FIG. 1, a width of the tapered waveguide 3 at an end portion (narrow end) at the input waveguide 1 side is wider than the width of the input waveguide 1, but is set at a value small enough to support a discrete spectrum of a certain number of optical modes.

Each of the output waveguides 2 has a width optimized by a numerical analysis method to obtain substantially equal power collecting efficiency, and in this embodiment, in order to compensate for the sharp decrease in the field intensity in edge regions, the outermost few output waveguides 2 are formed to be wider as compared with the other output waveguides 2.

It is preferable that a space between the output waveguides 2 is small to minimize excess optical power loss.

In this optical waveguide device, optical mode conversion is caused to occur to the incident light converted into a single optical mode by the input waveguide 1 by the aforementioned non-adiabatic structure in the tapered waveguide 3, and the power is split in the output waveguides 2 and outputted. The field intensity in an end portion of the tapered waveguide 3 at the side of output waveguides 2 (in FIG. 1, shown by ellipse E) sharply decreases at the edge regions as shown in FIG. 1, and is distributed in a substantially flat, optimal form.

The following two mechanisms can be considered as the mechanism for realizing the field intensity profile as described above according to the optical waveguide device (especially, the device having the linear taper) of the present embodiment.

The first mechanism is a re-distribution of power based on mode conversion along propagation of light in the tapered waveguide 3.

The total field distribution profile changes most rapidly at an end portion of the tapered waveguide 3 at the input waveguide 1 side, where the width of the tapered waveguide 3 and the number of optical modes are still small. Being further away from the aforementioned end portion, the shape of the total field intensity profile changes more slowly.

Figure 2:
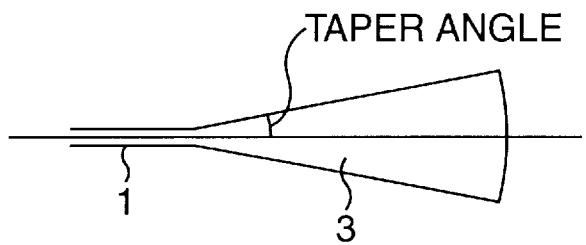
FIG. 2 is a schematic top view clearly showing a taper angle of a tapered waveguide in the optical waveguide device of the present embodiment.

FIG. 2 is a schematic top view clearly showing a taper angle of the tapered waveguide 3.

If the taper angle is increased, optical mode conversion is caused. The transition from adiabatic to non-adiabatic state is gradual. Using optical ray theory, an approximate minimum limit of the taper angle for starting mode conversion can be given. For symmetric excitation, the taper angle is preferably smaller than one fourth of the difference in propagation angle of the fundamental order mode and the second order mode.

If the second order mode does not exist at the wide end of the tapered waveguide 3, a critical angle is used instead of the propagation angle of the second order mode. The taper angle is preferably about 1° to 10°.

The second mechanism is the excitation of higher modes at the transition between the input waveguide 1 and the tapered waveguide 3, and this is clearly effective in combination with the first mechanism.

This effect occurs if the width of the end portion of the tapered waveguide 3 at the input waveguide 1 side is made larger than the width of the input waveguide 1 as shown in FIG. 1. The multi-mode excitation results in field intensity profile shape appearing at the end portion of the taper wall at the side of output waveguide 2, sharply decreasing in intensity in the edge regions. By widening the end portion of the tapered waveguide 3 at the input waveguide 1 side, the coupling efficiency is increased between the input waveguide 1 and the tapered waveguide 3, and also increases the steepness of the field intensity profile at the edge regions.

As explained above, according to the optical waveguide device of the present embodiment, the tapered waveguide 3 has a non-adiabatic structure causing mode conversion of the transmitted light, thus making it possible to obtain uniform optical coupling among the output waveguides 2. Further, in addition to this, the tapered waveguide 3 has a sufficiently large taper angle such that lower order modes couple into higher order modes in order to achieve the aforementioned non-adiabatic structure, thus making it unnecessary to increase the length of the waveguide as in the adiabatic structures, and in the case of providing many output ports to intend further uniform optical coupling, the entire device can be made compact. Specifically, it becomes possible to increase uniformity of optical coupling by providing many output ports, minimize the resultant increase in device size, and sufficiently meet the requirement for the size reduction of the device.

MODIFICATION EXAMPLE

Here various modification examples of the optical waveguide device according to the present embodiment will be explained. The same components as shown in FIG. 1 are given the same numerals and symbols and the explanation thereof will be omitted.

Modification Example 1

Figure 3:
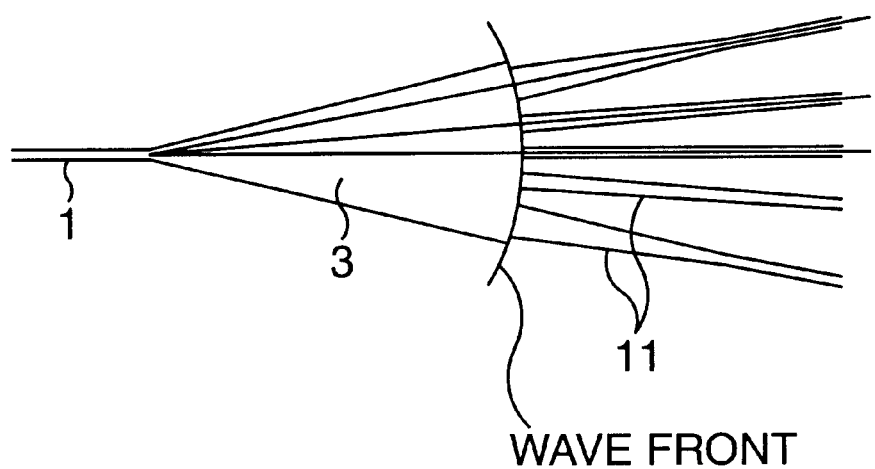
FIG. 3 is a schematic sectional view showing a main constitution of an optical waveguide device of a modification example 1 of the present embodiment.

FIG. 3 is a schematic sectional view showing a main constitution of the optical waveguide device of the modification example 1.

Each tapered output waveguide 11 is in a tapered form gradually increasing in width toward an optical output portion of the main taper and has a non-adiabatic state, that is, the tapered angle sufficiently large such that lower order optical modes couple into higher order optical modes during propagation of light along the tapered output waveguide 11. Further, the axis of each of the output waveguide 11 is provided in a direction toward a narrow end of the tapered waveguide 3, that is, the direction toward the end of the input waveguide 1.

As a result, since the optical phase front is curved, this makes it possible to obtain the highest coupling efficiency.

Further, it is preferable to place each of the tapered output waveguides 11 on an electromagnetic wave front at the wide end of the tapered waveguide 3.

Thus, equal phase can be obtained in each of the tapered output waveguides 11.

Modification Example 2

Figure 4:
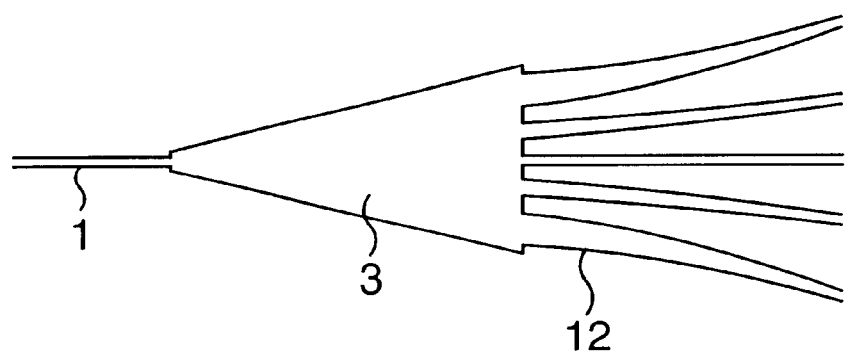
FIG. 4 is a schematic sectional view showing a main constitution of an optical waveguide device of a modification example 2 of the present embodiment.

FIG. 4 is a schematic sectional view showing a main constitution of the optical waveguide of the modification example 2.

Here, each bent tapered output waveguide 12 is in a tapered form similar to the tapered output waveguide 11 of the modification example 1 and is in a form gradually bent to the outside as it extends to an optical output portion.

As a result, the entire size of the optical waveguide device including the output waveguides 12 can be further reduced while high coupling efficiency is maintained.

EXAMPLE

Figure 5:
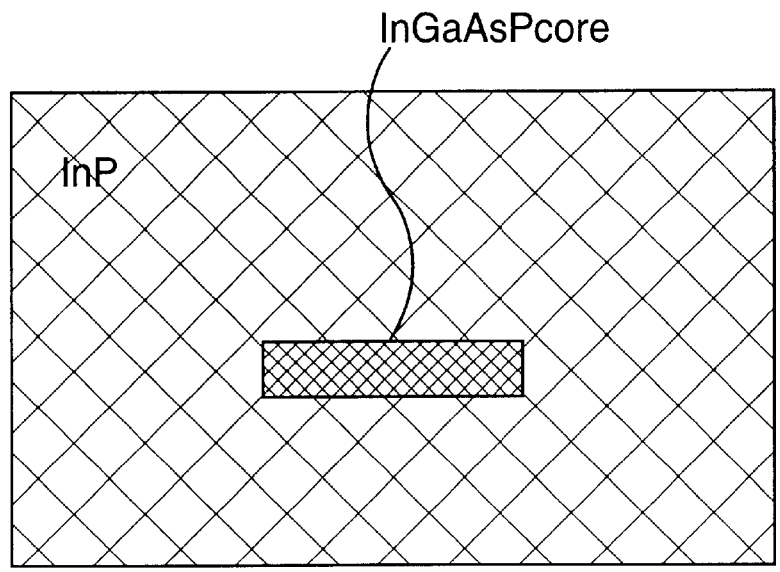
FIG. 5 is a schematic sectional view showing an InP-buried optical waveguide device having an InGaAsP core produced in the present embodiment.

The optical waveguide device as shown in FIG. 5 was actually fabricated correspondingly to FIG. 1 based on the present invention. This optical waveguide device was an InP-buried type of device having an InGaAsP core with a thickness of about 200 nm and bandgap wavelength of about 1.3 $\mu$m.

Here, the width of the narrow end of the tapered waveguide and the taper angle of the tapered waveguide were optimized using a wide-angle beam-propagation method simulation for obtaining a flat field intensity distribution profile at the wide end of the taper. From this, the combination of the aforementioned narrow end width and the aforementioned taper angle, a minimum output waveguide width, a minimum output waveguide spacing, and the minimum length of the taper depending on the number of output ports were calculated.

In this example, the minimum output waveguide width was about 1.6 μm, and the minimum output waveguide spacing was about 2.5 μm. Based on the requirement of a specific maximum excess energy loss, the outermost output waveguide widths are set to a suitable maximum value, thus obtaining uniform coupling for all the output waveguides.

Figure 6:
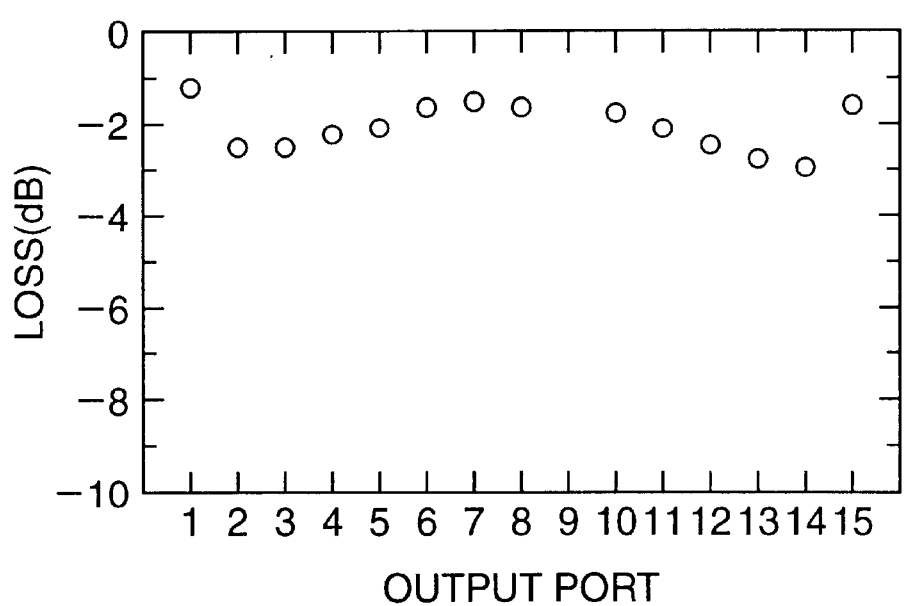
FIG. 6 is a graph of investigation of a loss (dB) of each output waveguide in a case in which a plurality of output waveguides are provided.
Figure 7:
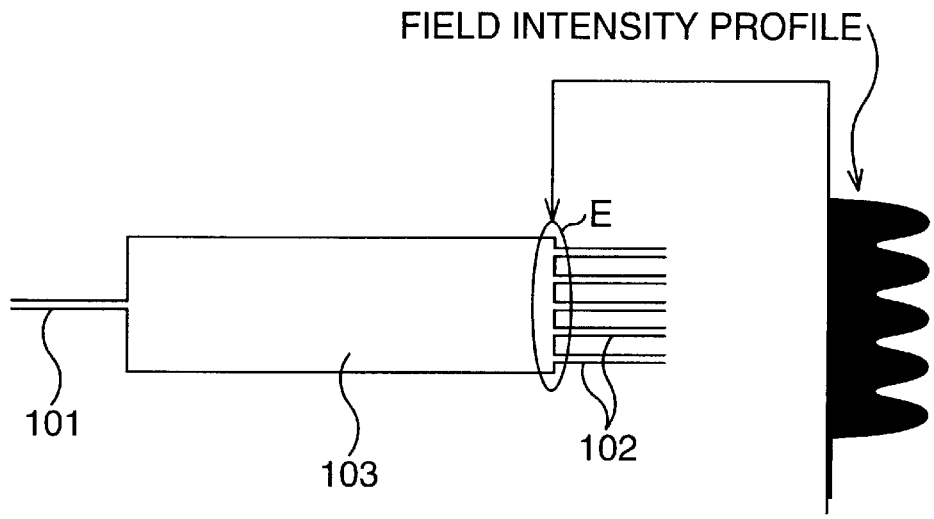
FIG. 7 is a schematic sectional view showing a Multi-Mode Interference device as a conventional optical waveguide device.
Figure 8:
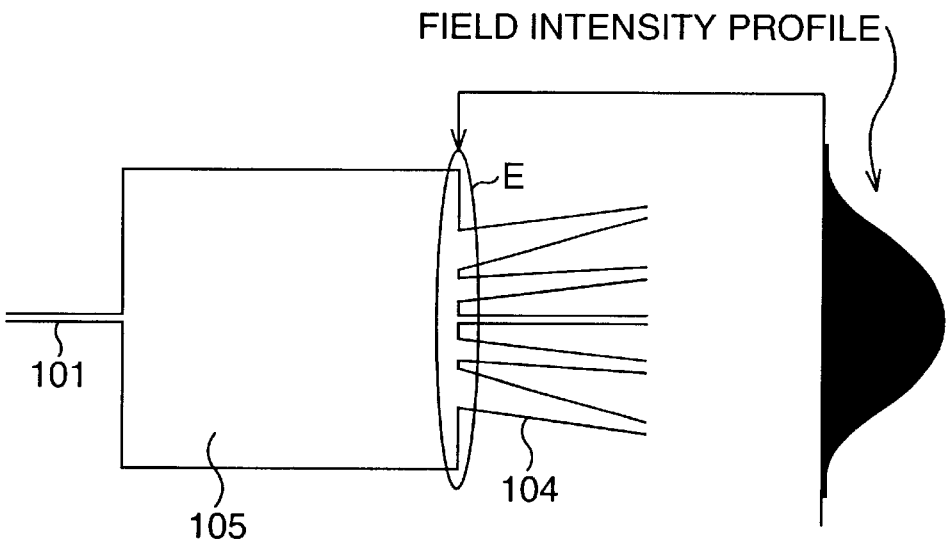
FIG. 8 is a schematic sectional view showing a Star coupler device as a conventional optical waveguide device.
Figure 9:
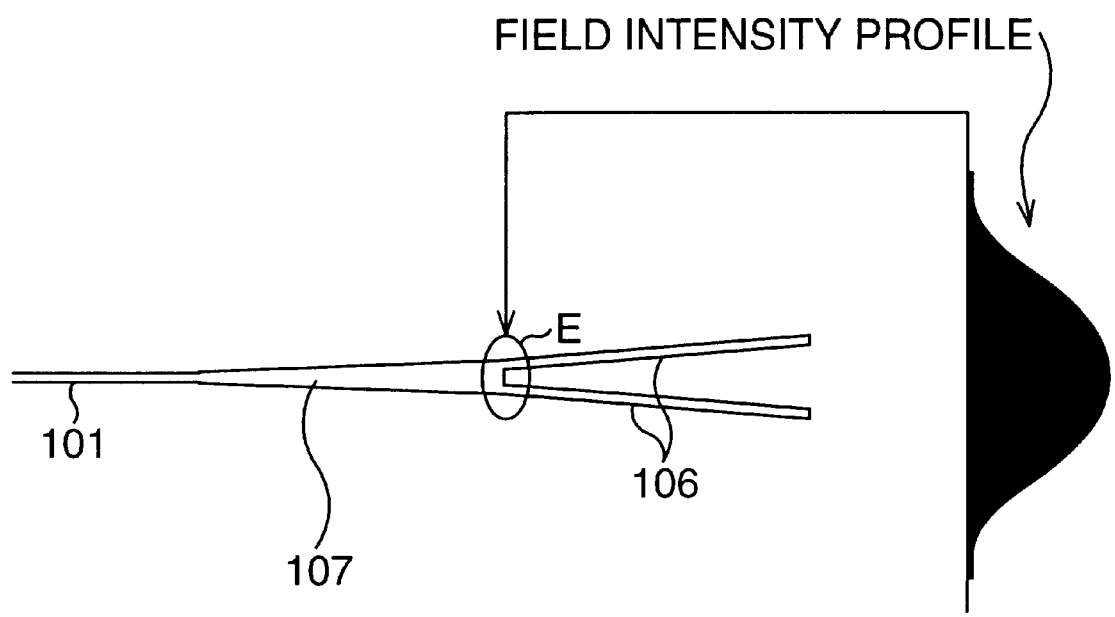
FIG. 9 is a schematic sectional view showing a Y-branch device as a conventional optical waveguide device.

FIG. 6 is a graph of investigated loss (dB) of each output waveguide in the case in which a plurality of output waveguides are provided.

As shown therein, extremely favorable result corresponding to the best form of field intensity profile in which a sharp decay is observed at the edge regions and the other regions are substantially flat.

According to the present invention, the optical waveguide device and the optical waveguide method are realized with high reliability and precision, which sufficiently satisfy both requirements for uniformity of optical coupling among the ports and reduction in the entire device size, and is applicable in various useful applications.

What is claimed is:

1. An optical waveguide device, comprising:

a single optical mode input waveguide;

a plurality of output waveguides; and a tapered waveguide for connecting said input waveguide and said output waveguides, gradually increasing in width from said input waveguide toward said output waveguides, wherein said tapered waveguide has a sufficiently large taper angle such that optical power in lower order optical modes couples into higher order optical modes while light propagates along the tapered waveguide, wherein width at a narrow end of said tapered waveguide is larger than width of said input waveguide but is set to a value small enough to support a discrete spectrum of a certain number of optical modes.

2. An optical waveguide device, comprising:

a single optical mode input waveguide;

a plurality of output waveguides; and a tapered waveguide for connecting said input waveguide and said output waveguides, gradually increasing in width from said input waveguide toward said output waveguides, wherein said tapered waveguide has a sufficiently large taper angle such that optical power in lower order optical modes couples into higher order optical modes while light propagates along the tapered waveguide, wherein said tapered waveguide has one or more linear taper planes in section made by optimizing the taper angle by a numerical analysis method such that a field intensity profile at a wide end of the tapered waveguide is maximally flat.

3. The optical waveguide device according to claim 2, wherein said output waveguides are provided in such a direction that axes thereof point to a narrow end of said tapered waveguide.

4. The optical waveguide device according to claim 2, wherein said output waveguides are placed on a wave front of an electromagnetic wave at the wide end of said tapered waveguide.

5. An optical waveguide device, comprising:

a single optical mode input waveguide;

a plurality of output waveguides; and a tapered waveguide for connecting said input waveguide and said output waveguides, gradually increasing in width from said input waveguide toward said output waveguides, wherein said tapered waveguide has a sufficiently large taper angle such that optical power in lower order optical modes couples into higher order optical modes while light propagates along the tapered waveguide, wherein each of said output waveguides has a width optimized by a numerical analysis method to obtain substantially equal power efficiency.

6. An optical waveguide device, comprising:

a single optical mode input waveguide;

a plurality of output waveguides; and a tapered waveguide for connecting said input waveguide and said output waveguides, gradually increasing in width from said input waveguide toward said output waveguides, wherein said tapered waveguide has a sufficiently large taper angle such that optical power in lower order optical modes couples into higher order optical modes while light propagates along the tapered waveguide, wherein said output waveguides are tapered, gradually increasing in width toward a wide end of said tapered waveguide.

7. The optical waveguide device according to claim 6, wherein each of said output waveguides has a sufficiently large taper angle such that optical power in higher order optical modes couples into lower order optical modes while light propagates along each of the output waveguides.

8. The optical waveguide device according to claim 6, wherein said output waveguides are in a bent form.

9. An optical waveguide method, comprising the steps of:

converting incident light into a single optical mode; and after guiding the converted light into a waveguide having a sufficiently large taper angle such that optical power in lower order optical modes couples into higher order optical modes, splitting power of the guided light into a plurality of powers, out outputting them, wherein a field intensity profile at a wide end of the waveguide is maximally flat.

10. An optical waveguide method, comprising the steps of:

converting incident light into a single optical mode; and after guiding the converted light into a waveguide having a sufficiently large taper angle such that optical power in lower order optical modes couples into higher order optical modes, splitting power of the guided light into a plurality of powers, out outputting them, wherein output is performed by splitting power of the guided light into a plurality of powers to obtain substantially equal power coupling efficiencies.

11. An optical waveguide device, comprising:

a single optical mode input waveguide;

a plurality of output waveguides; and a tapered waveguide for connecting said input waveguide and said output waveguides, gradually increasing in width from said input waveguide toward said output waveguides, wherein said tapered waveguide has a sufficiently large taper angle such that optical power in lower order optical modes couples into higher order optical modes while light propagates along the tapered waveguide, and wherein said tapered waveguide has the same refractive index as said input waveguide.

12. An optical waveguide method, comprising the steps of:

converting incident light from an input waveguide into a single optical mode; and after guiding the converted light into a waveguide having a sufficiently large taper angle such that optical power in lower order optical modes couples into higher order optical modes, and having the same refractive index as said input waveguide, splitting power of the guided light into a plurality of powers, and outputting them.

* * * * *